Figure 1:
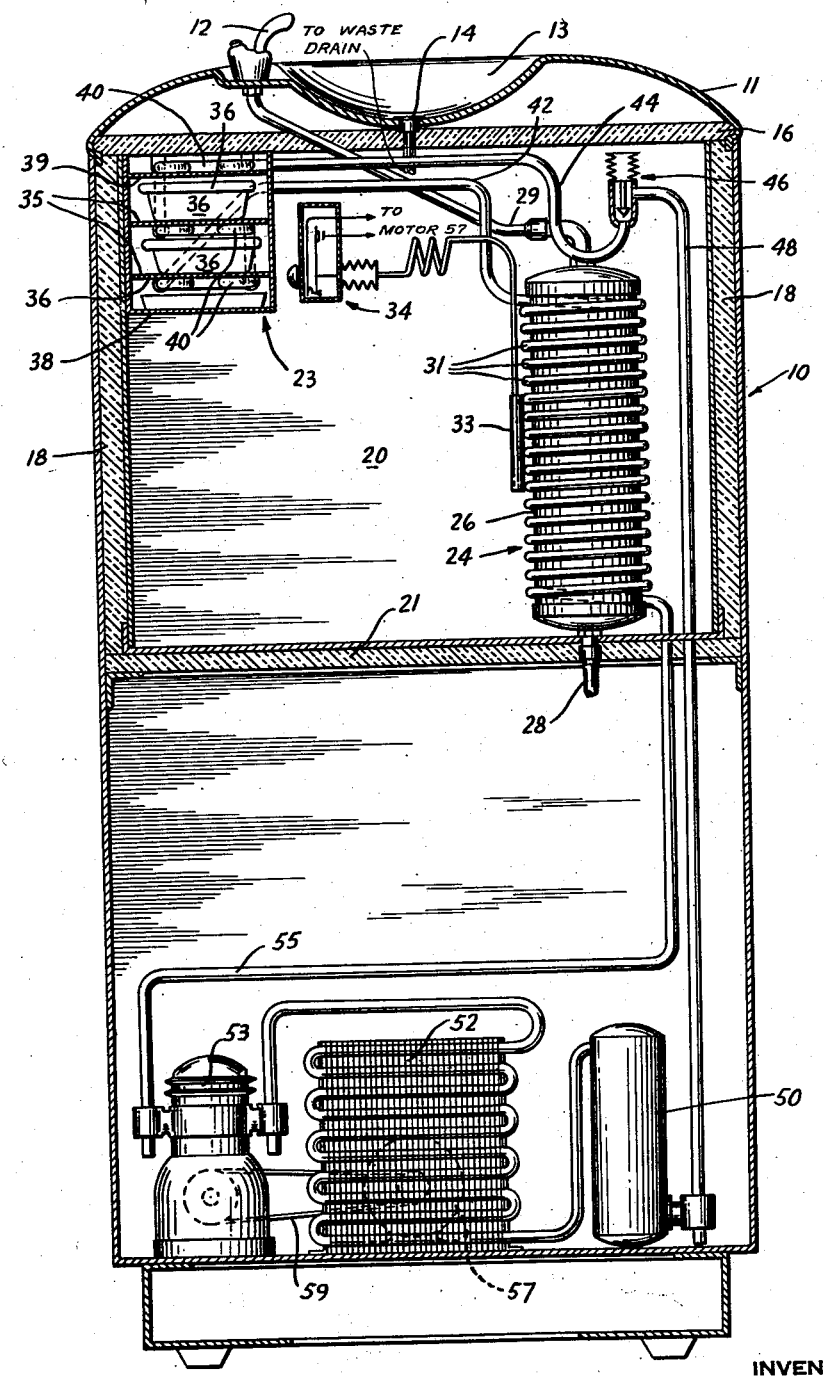

Aug. 5, 1952   H. J. KELLERSHON   2,605,621
SERIES CONNECTED ICE MAKER AND WATER COOLER
Filed Nov. 22, 1948   2 SHEETS—SHEET 2
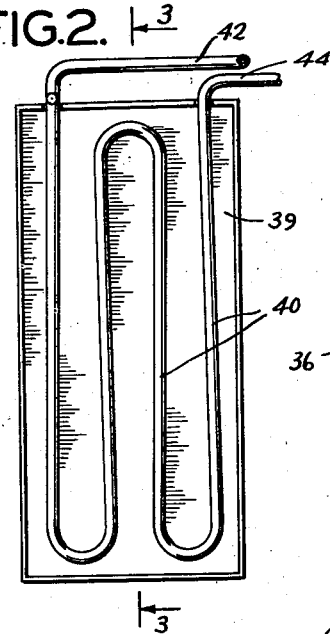
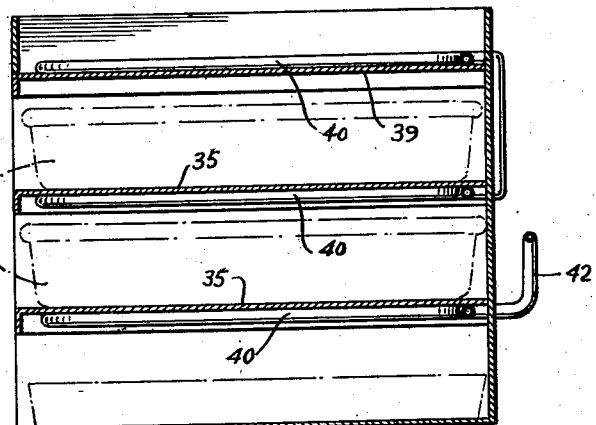
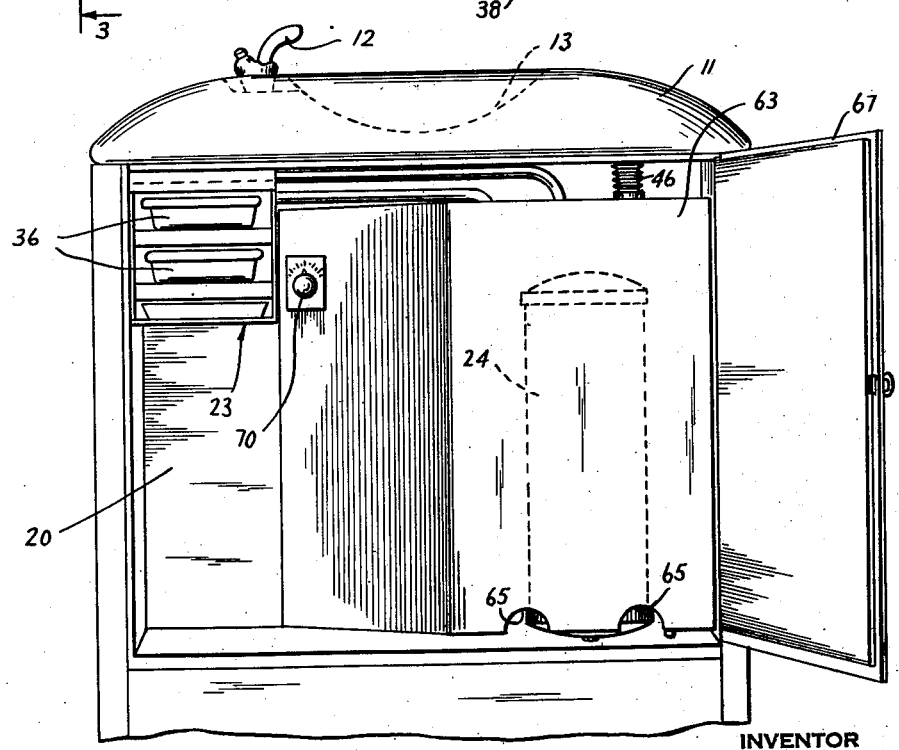
INVENTOR
Heinrich J. Kellershon
BY Emery, Varney,
Whittemore & Dix
ATTORNEYS Patented Aug. 5, 1952

2,605,621

UNITED STATES PATENT OFFICE 2,605,621

SERIES CONNECTED ICE MAKER AND WATER COOLER

Heinrich J. Kellershon, Douglaston, N. Y., assignor to Puro Filter Corporation of America, New York, N. Y., a corporation of New York Application November 22, 1948, Serial No. 61,321

3 Claims. (Cl. 62—141)

1

This invention relates to refrigerating apparatus having a drinking water cooler and a water freezing unit with a single control for the refrigerant.

It is an object of the invention to provide improved refrigerating apparatus in which refrigerant coils of a water freezing or ice unit are connected in series with the refrigerant coil of a water cooler and the supply of refrigerant is controlled by an automatic expansion valve operated by the low-side pressure of the refrigerating system.

It is a feature of the invention that the water cooler is not an auxiliary of the ice unit, but constitutes the basic part of the apparatus, and the supply of refrigerant to the ice unit is controlled in accordance with variations in the temperature of the water cooler. It is another feature of the invention that the heat losses from the water cooler, when no water is being used, are correlated with the heat losses from the ice unit so as to bring the refrigeration apparatus into operation at intervals short enough to prevent melting of the ice. In the preferred embodiment of the invention the water cooler supplies much of the refrigeration for a food and drink storage compartment.

It is another object of the invention to provide a water cooler, of the type in which water flows into and out of a cooler tank through openings in the bottom and top of the tank, with a refrigerating coil that cools the tank in such a way as to cause mixing of the warm and chilled water by convection currents to obtain an average temperature, and with a thermal-responsive control for the ice making unit operated from the water cooler and controlling refrigerant in such a way that the ice unit and water cooler can be connected in series and supplied with refrigerant through a simple pressure-operated expansion valve.

Other features of the invention relate to a refrigerator box and to combinations and correlations of the equipment of the box in a manner that obtains an adequately refrigerated food or drink storage space, in combination with a drinking water cooler and ice making unit, and with all of the refrigerant for the box, water cooler and ice unit controlled by a single expansion valve.

Other objects, features and advantages of the invention will appear or be pointed out as the description proceeds.

In the drawing, forming a part hereof, in in which like reference characters indicate corresponding parts in all the views:

2

Figure 1 is a sectional view, partly diagrammatic, of a combination refrigerator, water cooler and ice making unit embodying this invention, Figure 2 is an enlarged top plan view of the ice making unit, Figure 3 is an enlarged, vertical sectional view through the ice making unit of the refrigerator, Figure 4 is a front elevation of the upper part of the refrigerator with the door open to show the food storage compartment, ice trays, and a partition or baffle separating the food storage space from the water cooler.

The apparatus comprises a refrigerator box 10 having a cover 11 on which there is a drinking fountain 12 and a bowl 13 into which waste water from the drinking fountain flows. A drain 14 at the bottom of the bowl 13 leads to a waste water outlet. Below the cover 11 there is an insulating partition 16, and under this partition the cabinet 10 has insulated walls 18 enclosing a compartment 20. This compartment has an insulated bottom 21.

Within the compartment 20 there is an ice making unit 23 and a drinking water cooler 24. The water cooler comprises a cylindrical tank 26 with openings at its top and bottom for the flow of water into and out of the tank. In the preferred construction, water enters the tank 26 through an inlet pipe 28 at the bottom of the tank, and water flows from the top of the tank 26 to the drinking fountain 12 through piping 29.

The water cooler 24 includes also a cooling coil 31 wrapped around the cylindrical surface of the tank 26. The coil is bonded to the tank 26 to facilitate the transfer of heat. In the construction shown, refrigerant is supplied to the coil 31 at its upper end so that the refrigeration of the tank 26 is from the top down. This is advantageous because water chilled at the top of the tank will descend while warmer water in the lower portion of the tank rises in convection currents that tend to equalize the temperature of the water throughout the height of the tank. A bulb 33 of a thermal-responsive switch 34 is located against the water cooler 24 at a location midway between the upper and lower ends of the tank where the bulb 33 is subject to the average temperature of the water in the cooler 24.

The ice making unit 23 includes two shelves 35 for supporting ice trays 36, and a bottom shelf 38 for holding a pan into which water drips when the ice maker is being defrosted. A cover 39 extends over the upper ice tray 36. Each of the ice trays has divisions for making ice cubes in accordance with the usual practice. Refrigerating coils 40 are located under the shelves 35 and on top of the cover 39. These coils are connected in series, and the lower coil 40 is connected in series with the coil 31 of the water cooler by tubing 42.

It is a feature of the invention that the refrigerating coils 40 of the ice making unit 23 are of limited surface area and that the metal shelves 35 and other heat absorbing parts of the ice making unit are of limited extent so that the refrigerating capacity of the ice unit 23 is less than the refrigerating capacity of the refrigerant supply apparatus. This feature insures some refrigerant for the water cooler 24, even at times when the ice trays have just been filled with water. It will be understood that all references to "refrigerating capacity" denote operation under the intended operating conditions, that is, with the door of the food compartment opened only occasionally, and the temperature of the atmosphere surrounding the box within the range of room temperatures ordinarily encountered by apparatus of this kind, for example, temperatures not substantially in excess of 80° or 90° F.

Refrigerant is supplied to the coils 40 through tubing 44 from an expansion valve 46. This expansion valve, which is shown diagrammatically, is a straight automatic valve operated by the low-side pressure of the refrigerant, that is, the pressure in the tube 44. Liquid refrigerant under high pressure is supplied to the expansion valve 46 through a tubing 48 from a receiver 50. The receiver is supplied with liquid refrigerant from a condenser 52 into which vaporized refrigerant under high pressure is pumped by a compressor 53.

The inlet side of the compressor 53 is connected by tubing 55 with the lower end of the refrigerating coil 31 of the water cooler 24. The compressor 53 is driven by an electric motor 57, or from any other suitable source of power, through pulleys and a belt 59. The receiver 50, condenser 52, compressor 53 and motor 57 are housed in the lower part of the refrigerator box 10 under the insulated floor 21 of the food and drink storage compartment.

The motor 57 is supplied with power through a circuit controlled by the thermal-responsive switch 34, either directly, or through relays. This circuit is connected so that a rise in temperature of the water cooler 24 causes the bulb 33 to close the switch 34 and start the motor 57. The motor drives the compressor and pumps evaporated refrigerant from the tubing 55 and from the coils 31 and 40 in series with the tubing 55. This reduces the pressure in the coils and in the tubing 44 upstream from the coils so that the expansion valve 46 opens and admits additional refrigerant into the tubing 44 and the refrigerating coils. This refrigerant flows into the coils 40, evaporating as it can absorb sufficient heat to produce evaporation, and some of the liquid refrigerant travels as far as the coil 31 of the water cooler where it evaporates to cool the water in the tank. As soon as the temperature of the water cooler 24 drops to a predetermined value, the chilling of the bulb 33 causes the thermal-responsive switch 34 to open and stop the operation of the refrigerating unit.

The water cooler 24 is in a space which is separated from the remainder of the food and drink storage space of the compartment 20 by a partition 63. This partition, which is preferably of metal, does not extend to the top of the food and drink storage compartment, there being a clearance at the upper end of the partition for the flow of warmer air over the top of the partition and into the space occupied by the water cooler. Air in contact with the uninsulated refrigerating coil 31 around the water tank is chilled and sinks to the floor 21. This chilled air flows out from the water cooler space, through openings 65 at the bottom portion of the partition 63, into the food and drink storage space of the compartment 20.

Although the ice making unit 23 is also in a position to chill the air in the compartment 20, only limited provision is made for promoting a circulation of air around the coils of the ice unit 23 as in the case of the water cooler. The absorption of heat by the water cooler from the air in the compartment 20 is an important feature of the invention. Because of it, the cooling coil of the water cooler supplies a large part of the refrigeration for the storage compartment and thus makes up a large portion of the heat losses through the insulated walls of the refrigerator and through a door 67 that closes the front of the storage compartment 20. Refrigeration losses through opening of the door 67 are likewise supplied largely from the refrigerating coil of the water cooler.

As a result of this feature by which the water cooler refrigerates the storage compartment, the temperature of the water cooler rises progressively, though slowly, whenever the compressor is not in operation, even though no water is drawn from the water cooler tank. This causes the thermal-responsive switch of the water cooler to close and operate the refrigeration unit at periods that are short enough to prevent melting of the ice in the trays 36. The effective heat absorbing area of the ice making unit 23 and that of the water cooler 24 must be correlated, taking into consideration the difference in air circulation past the heat absorbing areas and the difference in temperature of the ice unit 23 and the drinking water cooler 24. Since the ice unit 23 is considerably colder than the water cooler 24, the temperature gradient causing heat flow to the ice making unit 23 is greater than that causing heat flow to the water cooler 24. The temperature differences between these units depend also on the temperature of the refrigerant supplied, and this in turn is dependent upon the kind of refrigerant and the pressure in the refrigerating system.

For example, experience has shown that methyl chloride can be used with a low-side pressure corresponding to a temperature of about 10° F. to cool the ice making unit to approximately 15° F. and the water in the cooler to a temperature of the order of 42°. The thermal-responsive switch 34 can be adjusted by a knob 70 to respond to a comparatively small rise in the temperature of the water before the temperature of the ice has risen to a level approaching its melting point. These figures are given merely by way of illustration, and it will be understood that the invention is in no way limited to these illustrative temperatures, or ratio of temperatures.

The preferred embodiment of the invention has been illustrated and described, but changes and modifications can be made and some features can be used alone or in different combinations without departing from the invention as defined in the claims.

I claim:

1. Refrigerating apparatus including, in combination, a compressor, an electric motor that drives the compressor, a condenser, an insulated refrigerator box, an expansion valve to which liquid refrigerant is supplied from the condenser, said expansion valve being operated entirely by pressure of the expanded refrigerant beyond the valve, a water cooler in the refrigerator box comprising a cylindrical tank with its axis substantially vertical and with a water inlet communicating with the bottom of the tank and a water outlet leading from the top of the tank and a refrigerating coil surrounding and connected with the outside of the tank, a partition dividing the water cooler from the remainder of the refrigerator box, said partition having an open space at its upper and lower ends for the circulation of air into and out of the space in which the water cooler is contained, an ice maker unit located in the refrigerator box, a door on the front of the refrigerator box, ice trays in the ice maker unit in position to be withdrawn from the box when the door is open, refrigerating coils in the ice maker unit adjacent the ice trays and connected in series between the expansion valve and the upper end of the refrigerant coil of the water cooler, a thermal responsive switch actuator on the coil of the water cooler at a level substantially midway between the upper and lower ends of the water cooler tank, said switch actuator being connected with a switch in the circuit of the compressor motor, the expansion valve being correlated with the other structure of the system to produce a temperature at the ice maker unit at least as low as approximately 15° F., and the thermal responsive switch actuator being so coordinated with the heat losses from the water cooler, when no water is withdrawn and the door of the refrigerator box is closed, that it starts the compressor at intervals less than the time required for the ice in the trays to begin melting.

2. Refrigerating apparatus including a food and drink storage compartment, and a water freezing unit adjacent said compartment, a water cooler in said compartment comprising a tank having a vertically extending wall and a water connection at its upper end and lower ends and a refrigerating coil surrounding the tank and in contact with the vertically extending wall of the tank, a baffle partition in front of the water cooler in position to promote the circulation of air from the upper part of the compartment downward across the refrigerating coil of the water cooler and back into the lower portion of the compartment, a refrigerating coil in the water freezing unit connected in series with tthe coil of the water cooler and on the upstream side of the water cooler coil, an expansion valve through which refrigerant is supplied to the water freezing unit, and a thermal responsive control device on the coil of the water cooler and adjusted to operate on a temperature differential at the water cooler that corresponds with a period of heat loss from the water cooler which is shorter than the period within which ice in the water freezer unit rises to a temperature approaching its melting point.

3. A combination refrigerator and water cooler comprising a cabinet in which there is a food storage compartment, a door that can be opened for access to the food storage compartment, an ice maker in the cabinet, a water cooler located in the cabinet and extending both above and below a middle level of the food storage compartment and in position to supply the principal refrigeration for said food storage compartment, the ice maker and water cooler having refrigerant passages connected together in series relation, a source of refrigerant communicating with the passages and connected with the ice maker upstream from the water cooler, a controller that selectively initiates and shuts off the supply of refrigerant from said source, a temperature responsive element in thermal contact with the refrigerant in the refrigerant passage of the water cooler and subject to the direct influence of the refrigerant in said passage, and a connection through which the controller is operated by said temperature-responsive element.

HEINRICH J. KELLERSHON.

REFERENCES CITED

The following references are of record in the file of this patent:

UNITED STATES PATENTS

| Number | Name | Date |
|---|---|---|
| 1,790,236 | Hull | Jan. 27, 1931 |
| 1,825,665 | Hull | Oct. 6, 1931 |
| 1,895,859 | Muffly | Jan. 31, 1933 |
| 1,987,947 | Smith | Jan. 15, 1935 |
| 2,039,188 | Reeves | Apr. 28, 1936 |